(12) United States Patent
Norton

(10) Patent No.: US 6,243,689 B1
(45) Date of Patent: Jun. 5, 2001

(54) SYSTEM AND METHOD FOR AUTHORIZING ELECTRONIC FUNDS TRANSFER AT A POINT OF SALE

(76) Inventor: Robert G. Norton, 8489 Rua Branco Dr., Sandy, UT (US) 84116

( * ) Notice: Subject to any disclaimer, the term of this patent is extended or adjusted under 35 U.S.C. 154(b) by 0 days.

(21) Appl. No.: 09/222,060

(22) Filed: Dec. 29, 1998

(51) Int. Cl.⁷ .................................................. G06F 17/60
(52) U.S. Cl. ............................................................ 705/18
(58) Field of Search ................................................. 705/18

(56) References Cited

U.S. PATENT DOCUMENTS

| | | | |
|---|---|---|---|
| 3,692,298 | * 9/1972 | Peacock | 270/12 |
| 4,560,293 | * 12/1985 | McCumber et al. | 400/61 |
| 4,637,634 | * 1/1987 | Troy et al. | 705/14 |
| 5,175,682 | * 12/1992 | Higashiyama et al. | 705/45 |
| 5,251,936 | * 10/1993 | Fitzgibbons | 283/58 |
| 5,371,798 | * 12/1994 | McWhortor | 380/51 |
| 5,598,474 | * 1/1997 | Johnson | 380/23 |
| 5,727,249 | * 3/1998 | Pollin | 705/40 |
| 5,754,653 | * 5/1998 | Canfield | 380/24 |
| 5,770,849 | * 6/1998 | Novis et al. | 235/492 |
| 5,832,464 | * 11/1998 | Houvener et al. | 705/45 |
| 6,003,763 | * 12/1999 | Gallagher et al. | 235/379 |
| 6,016,476 | * 1/2000 | Maes et al. | 705/1 |
| 6,026,166 | * 2/2000 | LeBourgeois | 380/25 |
| 6,032,137 | * 2/2000 | Ballard | 705/75 |

FOREIGN PATENT DOCUMENTS

| | | |
|---|---|---|
| 0426507 | * 11/1989 | (EP). |
| 0481135 | * 4/1992 | (EP). |
| 0519843 | * 12/1992 | (EP). |

OTHER PUBLICATIONS

Newkirk, K M; "The Future of Check Truncation," Independent Banker, v46, n2, p. 61–62, Feb. 1996 (DIALOG).*
Clark, D; "Electronic Payment: Still Pushing the Envelope," American Banker, p. 18, Aug. 14, 1997 (DIALOG).*
"AZTEC seen as step EFT," Financial Services Report, v8, n1, p. N/A, Jan. 9, 1991 (DIALOG).*
"Check POS Pilot Targets Retailers," Bank Systems & Technology, v34, n5, p. 14, May 1997 (DIALOG).*

* cited by examiner

*Primary Examiner*—Vincent Millin
*Assistant Examiner*—Forest O Thompson
(74) *Attorney, Agent, or Firm*—Thorpe North & Western, LLC

(57) ABSTRACT

A system and method for a payee to initiate at a point of sale an electronic funds transfer from an account of a payor to the account of the payee, comprising the steps of: obtaining from the payor the duplicate part of a completed two-part draft instrument comprising an original and a duplicate and having account identifying information printed thereon in machine-readable form, the original being configured for use as a conventional draft instrument, and the duplicate being configured for selective use as either a duplicate of the original, or as the originating document for an electronic funds transfer, said duplicate part of the draft instrument being completed by the payor to authorize the payee to present the check electronically so as to initiate an electronic funds transfer for the face amount of the instrument; scanning the instrument to electronically read the account identifying information; presenting the instrument electronically through an electronic clearing house network so as to initiate at the point of sale an electronic funds transfer from the payor to the payee; keeping the duplicate part of the instrument as the payee's record of the electronic funds transfer authorization; allowing the payor to keep the original part of the instrument as a record of the electronic funds transfer authorization. Also a two-part draft instrument form comprising: a first part configured for use as a conventional paper draft instrument; and a second part configured for being a duplicate of the first part, and also configured for separate selective use as the originating document for an electronic funds transfer.

19 Claims, 7 Drawing Sheets

SYSTEM AND METHOD FOR AUTHORIZING ELECTRONIC FUNDS TRANSFER AT A POINT OF SALE

BACKGROUND OF THE INVENTION

1. Field of the Invention

This invention relates to a method for authorizing electronic funds transfers. More particularly, the present invention relates to a simplified method whereby a consumer may use the original part of a two-part personal check in its normal manner as a check, or alternatively use the duplicate part thereof as an authorizing document for an electronic funds transfer to a merchant at the point of sale.

2. State of the Art

The Automated Clearing House ("ACH") is a network of the Federal Reserve System that allows Electronic Funds Transfers ("EFT") between member banks. The Board of Governors of the Federal Reserve has determined that it is in the best interest of the Federal Reserve System and member banks to promulgate new rules or modify existing rules to enable the ACH system to process consumer check transactions electronically from typical retail points of sale ("POS") using a conventional paper check as one of the originating documents required under the Electronic Funds Transfer Act of 1978 and Regulation E thereof. The processing of checks electronically not only saves processing time and expense, but also obviates the need to physically transport large volumes of paper checks from place to place within the banking system.

Under current laws and regulations promulgated by the National Automated Clearing House Association ("NACHA"), a valid EFT authorization requires (i) a writing, (ii) signed by the maker, (iii) ordering an ACH transaction, (iv) specifying the amount, (v) the date of order, and (vi) provision of a copy of such writing contemporaneously to the maker. Because of these strict requirements, a conventional paper check does not conform to the specifications for an ACH transaction, and thus a separate, additional written instrument must be created to comply with applicable law. Furthermore, consumers are accustomed to receiving canceled checks returned with their monthly bank statements, and merchants require any dishonored or fraudulent items to be returned to the merchant's bank to facilitate disposition and collection or legal action. NACHA has authorized a pilot program for electronic conversion of checks at a retail point of sale under two models.

Under the first model, called the "Consumer as Keeper" model, the merchant would (i) scan the paper check using standard magnetic ink character recognition ("MICR") equipment, (ii) create a separate writing at the POS containing the required Reg. E authorizing language, (iii) ask the consumer to sign the Reg. E writing, (iv) stamp "VOID" on the original check, (v) return the voided paper check to the customer at the POS, and (vi) return to the customer a copy of the Reg. E writing signed by the customer. Under this model, the merchant retains the original of the Reg. E authority writing as evidence of the ACH transaction with the customer's consent and of the merchant's compliance with applicable law.

Under the second model, called the "Merchant as Keeper" model, the merchant would (i) scan the paper check using MICR equipment, (ii) create a separate writing at the POS containing the required Reg. E authorizing language, (iii) ask the customer to sign the Reg. E writing, (iv) stamp "VOID" on the original check, (v) place the voided paper check in the merchant's archival storage, and (vi) tender to the customer a copy of the Reg. F writing signed by the customer. Under this model the merchant would be required to archive the original of the Reg. E. authority writing and the voided check for seven years as evidence of the ACH transaction with customer's consent, and of the merchant's compliance with applicable law.

However, both of these models fail to address the preferences of both the customer and merchant. Consumers prefer to have their canceled checks returned to them with their periodic bank statement to aid in reconciliation of their checking accounts. However, merchants prefer to have customer's banks return all dishonored checks to the merchant for further disposition, including debt collection and/or legal action. Under either model of the NACHA pilot program for electronic conversion of checks at a retail point of sale, one or the other of these preferences can be met, but not both.

There is thus a need for a simple system and method for a consumer using a check to authorize an electronic funds transfer by a merchant at the point of sale where the both the customer and the merchant may retain copies of the check and the EFT authorizing documentation without requiring additional documents to be created beyond the check itself.

OBJECTS AND SUMMARY OF THE INVENTION

It is therefore an object of the present invention to provide a system and method for a customer to authorize an electronic funds transfer by a merchant at the point of sale which allows both the customer and merchant to retain copies of the transaction documentation for their records.

It is another object of this invention to provide a simple system and method for a customer to authorize an electronic funds transfer by a merchant at the point of sale by the use of a specially configured two-part check, without the need for additional documents.

It is another object of this invention to provide a two-part check having a first part configured for use as a conventional paper check, and having a second part that is both a duplicate of the first part and is also configured for separate use as the originating document for an electronic funds transfer.

The above and other objects are realized in a system and method for a merchant to obtain an electronic funds transfer from a customer at the point of sale, comprising the steps of: obtaining from the customer the duplicate part of a two-part paper check comprising an original part and a duplicate part, the original being configured for use as a conventional paper check, and the duplicate being configured for use as either a duplicate of the original or as the originating document for an electronic funds transfer, said duplicate being completed by the customer to authorize the merchant to present the check electronically so as to effectuate an electronic funds transfer for the face amount of the check; presenting the check electronically through an electronic clearing house network so as to initiate at the point of sale an electronic funds transfer from the funds of the customer to the funds of the merchant in the amount of the check; keeping the duplicate part of the paper check as a merchant's record of the electronic funds transfer authorization; and allowing the customer to retain the original part of the paper check as a record of the electronic funds transfer authorization.

Some of the above objects are also realized in a system for authorizing an electronic funds transfer from a customer to a merchant at the point of sale, comprising: a two-part paper check comprising an original and a duplicate, the original being configured for use as a conventional paper check, and the duplicate being configured for use as either a duplicate of the conventional paper check or as the originating document for an electronic funds transfer; and means for electronically presenting the check, whereby the merchant may present the check electronically through an automated clearing house network so as to initiate from the point of sale an electronic funds transfer.

These and other objects are also realized in a two-part check having a first part configured for use as a conventional paper check, and having a second part that is configured for use as a duplicate of the first part or for separate use as the originating document for an electronic funds transfer. Other objects and features of the present invention will be apparent to those skilled in the art, based on the following description, taken in combination with the accompanying drawings.

DETAILED DESCRIPTION OF THE PREFERRED EMBODIMENT

Figure 1:
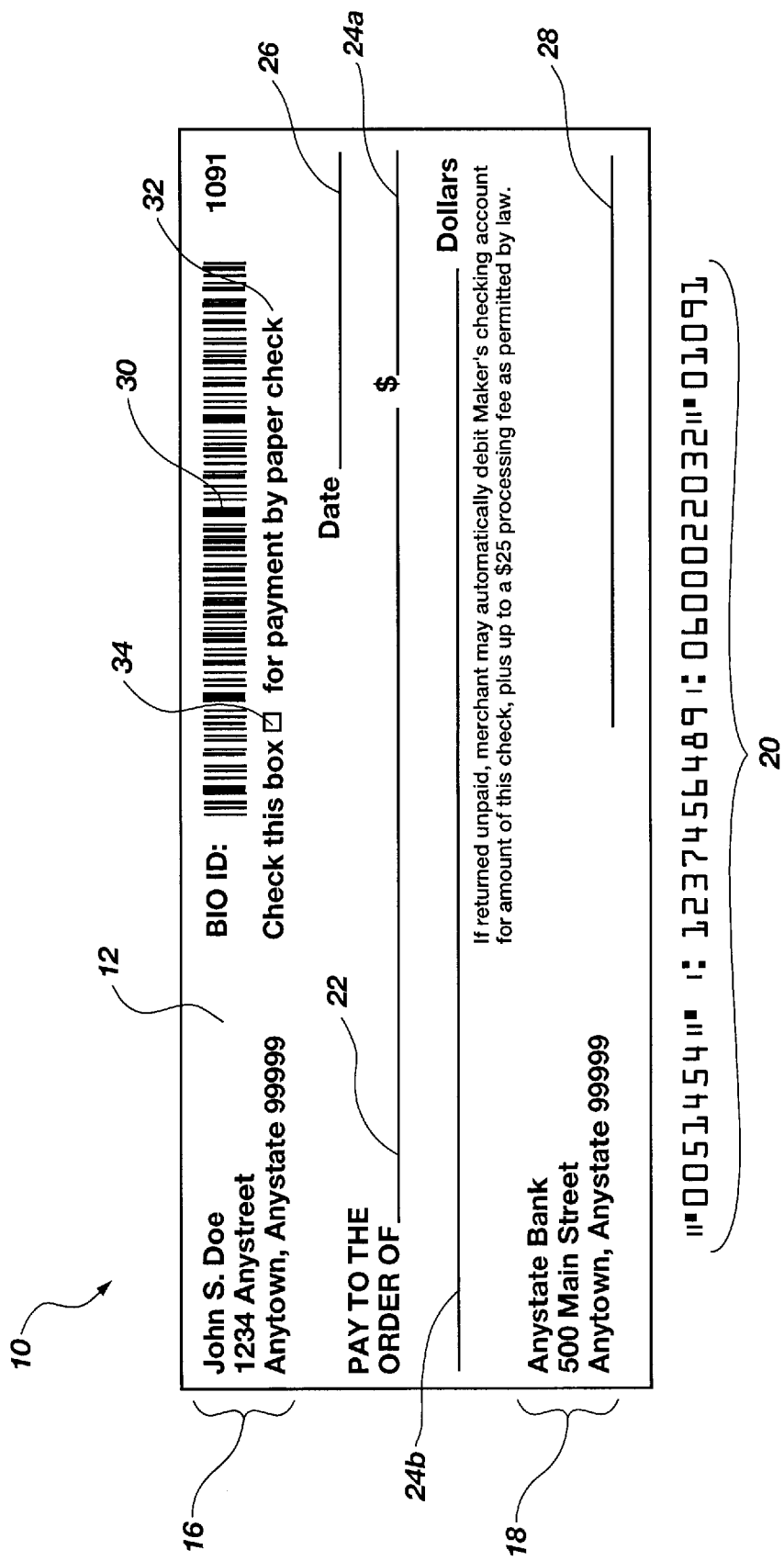
FIG. 1 is a front view of the top or original part of a two-part personal check according to the present invention.

Referring now to the drawings:

FIG. 1 is a front view of the top or original part 12 of a two-part personal check 10 according to the present invention. The check 10 is similar in many respects to two-part personal checks which are well known in the industry, having a top part original 12, and a bottom duplicate part 14 (FIG. 2), which is similarly printed and obtains an imprint of the writing on the original when the person making the check presses down with a writing instrument. The top part 12 includes the basic features of a typical check, including the bearer's name and address 16, the name and address 18 of the bank holding the account, the bank transfer number and customer account number 20, and lines where the maker of the check may fill in essential information, including the name of the entity to whom the check is payable 22, the amount to be paid 24a and 24b, the date 26, and a line for the maker's signature 28. As used herein, the term "bank" is intended to mean any financial institution which pays funds from a payor account upon presentation of a draft instrument.

Figure 7:
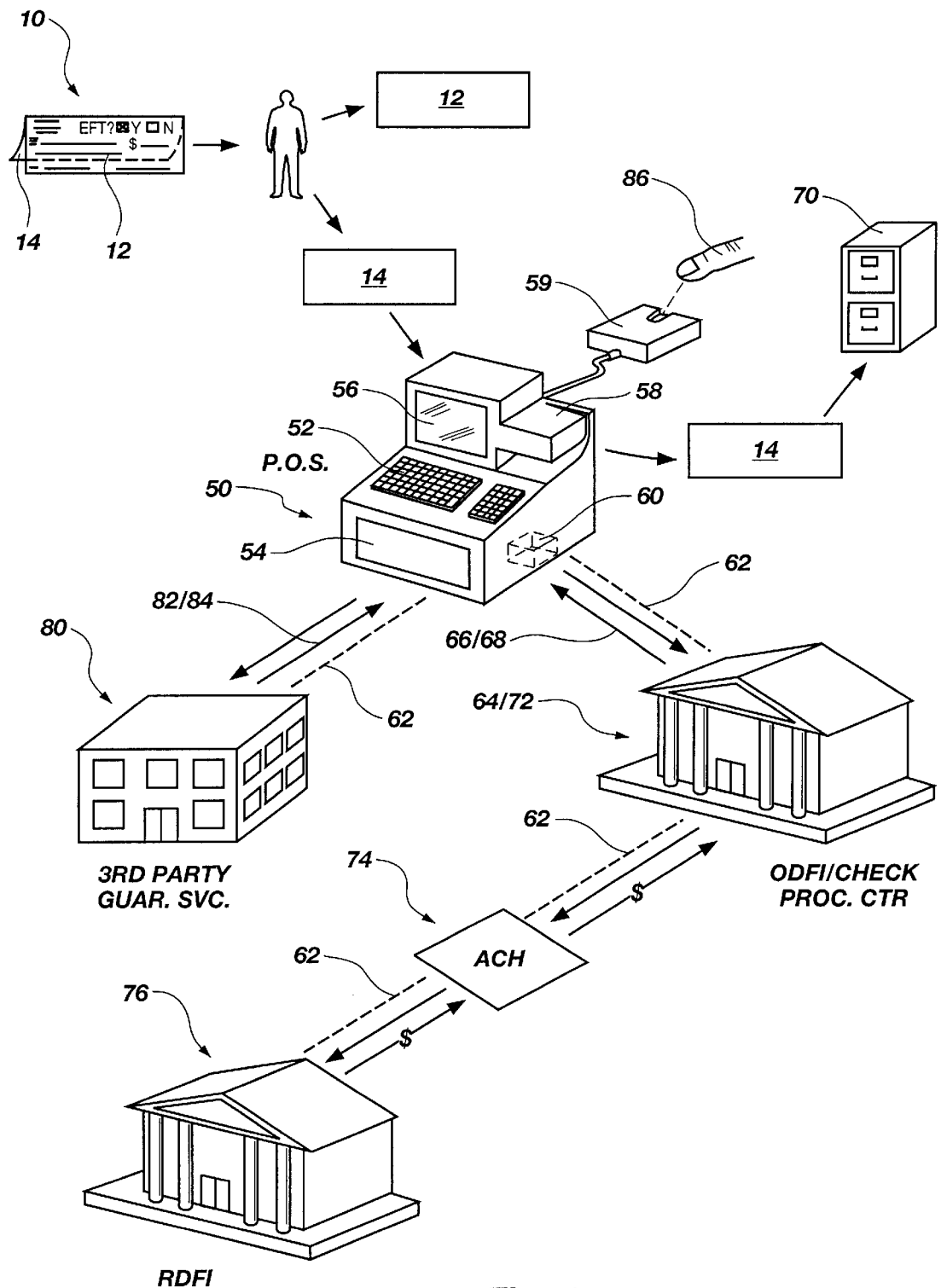
FIG. 7 is a schematic diagram of a system for effectuating an electronic funds transfer at the point of sale according to the principles of the present invention.

It will be apparent that described items on the face of the check need not be presented in exactly the form shown in FIG. 1, and that other useful, informational, or even decorative features may be provided within the scope of the present invention and in accordance with applicable laws and regulations for checks. The bank transfer number and customer account number 20 are typically printed with magnetic ink to allow them to be read by magnetic ink character recognition ("MICR") equipment as is well known in the industry. Modern point of sale devices such as device 50 shown in FIG. 7 frequently include MICR reading equipment 60 as depicted. The check may also include a machine readable biometric identification code, such as a bar code 30, a magnetic strip (not shown), or other machine readable code which contains biometric or other information useful in verifying the identity of the individual making the check, as will be discussed in more detail below. The check may include other optional features as desired, such as a memorandum line (not shown) in the lower left hand corner of the instrument, and a notation indicating that the maker authorizes up to a $25 processing fee if the check is dishonored. It will be apparent that many configurations may be used to satisfy applicable regulations and the purposes of this invention.

In accordance with the principles of this invention, the top part 12 of the check also includes a line 32 indicating "Check this box ☐ for payment by paper check." The check-box 34 may be checked to designate that the check 10 is to be used as an ordinary paper check. When the check is intended to be used to authorize an electronic funds transfer, the box 34 is not checked, and other features described below become significant. It must be noted that this notation on the face of the check is not essential, and if present need not be presented in exactly this way. Other means of indicating on the face of the check whether it is to be used to authorize an electronic funds transfer or not may be employed in compliance with applicable laws and regulations, without departing from the spirit of this invention. All that is needed is that the check include the information required for it to be a valid instrument. Moreover, mere presentment of a valid EFT authorizing instrument without any additional notations is sufficient.

If the check is to be used in the conventional fashion, after the customer fills out and signs the check, the box 34 is checked. The top, original part 12 of the check is given to the merchant, and processed as a check in the usual manner. The customer retains the duplicate part 14 as a record of the check, as is the typical mode of use of two-part checks.

Figure 2:
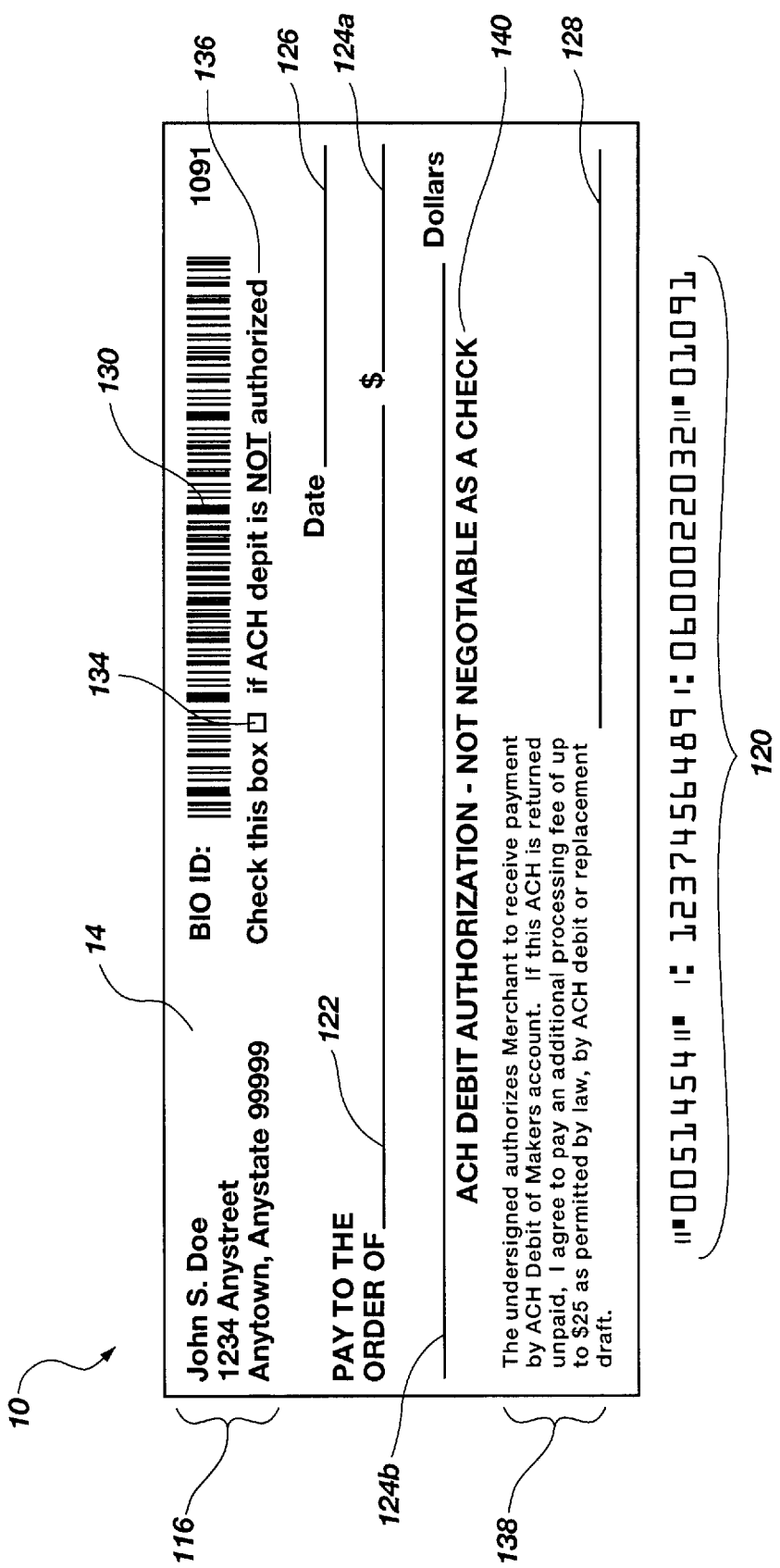
FIG. 2 is a front view of the bottom or duplicate part of a two-part personal check according to the present invention.

However, if the check is to be used as an electronic funds transfer authorization, the box 34 is not checked, and the additional features described below become important. As shown in FIG. 2, the bottom or duplicate part 14 of the two-part personal check 10 includes most of the elements of the top part, including the bearer's name and address 116, the bank transfer number and customer account number 120 in machine readable form (MICR), the machine readable biometric identification code 130, if present on the original, and lines corresponding to the lines on the top part 12 for the name of the payee 122, the amount to be paid 124a and 124b, the date 126, and the maker's signature 128. The duplicate part 14 may also include the bank name and address (not shown), and includes a duplicate 134 of the check-box 34, to be checked to designate whether an EFT is authorized. It will be appreciated that as a duplicate part, the information lines and check-box will be automatically filled in on the duplicate 14 when the maker presses down with a writing instrument in filling out the same items on the original 12. However, as will become apparent, both the customer account number/bank transfer number 120 and the biometric identification code must be in machine readable form on the duplicate 14 to allow the electronic transaction to proceed.

The duplicate 14 differs from the original 12 in several critical respects, however. Adjacent to the check-box 134 is an indication 136 stating "Check this box ☐ if ACH debit is NOT authorized". As noted above, this notation 136 is primarily for convenience, and need not be present for the instrument to be valid. Mere presentment of the complete instrument is sufficient to authorize an EFT transaction because the face of the instrument also includes a notation 138 which indicates that the instrument authorizes the merchant to receive payment by ACH debit from the maker's account. This or similar language is the critical component of an EFT authorizing instrument under the rules. If the box 134 is checked, this notation indicates that the duplicate 14 is merely a copy of the paper check. Otherwise, if the box 134 is not checked, the duplicate 14 may be used as a writing authorizing an EFT. In accordance with NACHA rules, The notation 138 may also include an indication authorizing up to a $25 processing fee if the instrument is dishonored, in a manner similar to a check. Immediately below the amount payable line 124b is another notation 140 stating "ACH DEBIT AUTHORIZATION—NOT NEGOTIABLE AS A CHECK." These notations, 136, 138, and 140, or their equivalent, are included on the duplicate 14 to allow it to satisfy the requirements of Reg. E for EFT authorizing documents, and to prevent the duplicate from being used as an ordinary check. Corresponding notations do not appear on the original 12 because the original is only intended to operate as a check. The separation of these notations onto different forms helps prevent the possibility of double payment. It also helps distinguish the parts of the form which are to be kept by the respective parties to the transaction, as will be more apparent from the following discussion of the system and method of use of this invention.

FIGS. 3, 4, 5, and 6 present flow charts of various embodiments of the process of electronic funds transfer according to the present invention. Throughout the following discussion of FIGS. 3, 4, 5, and 6, reference numerals will also be cited from FIG. 7, which presents a schematic diagram of a system for effectuating electronic funds transfers at a point of sale according to the principles of the present invention. It will be apparent that the various sequences of steps in the methods shown may be mixed and combined in various ways, and thus these figures should be considered together. Additionally, in this discussion the terms "merchant" and "customer" will be used to identify the payee and payor, respectively. However, it will be apparent that any payor and payee could execute an electronic funds transfer in accordance with the principles of this invention, and the invention is in no way limited to use by merchants and their customers.

Figure 3:
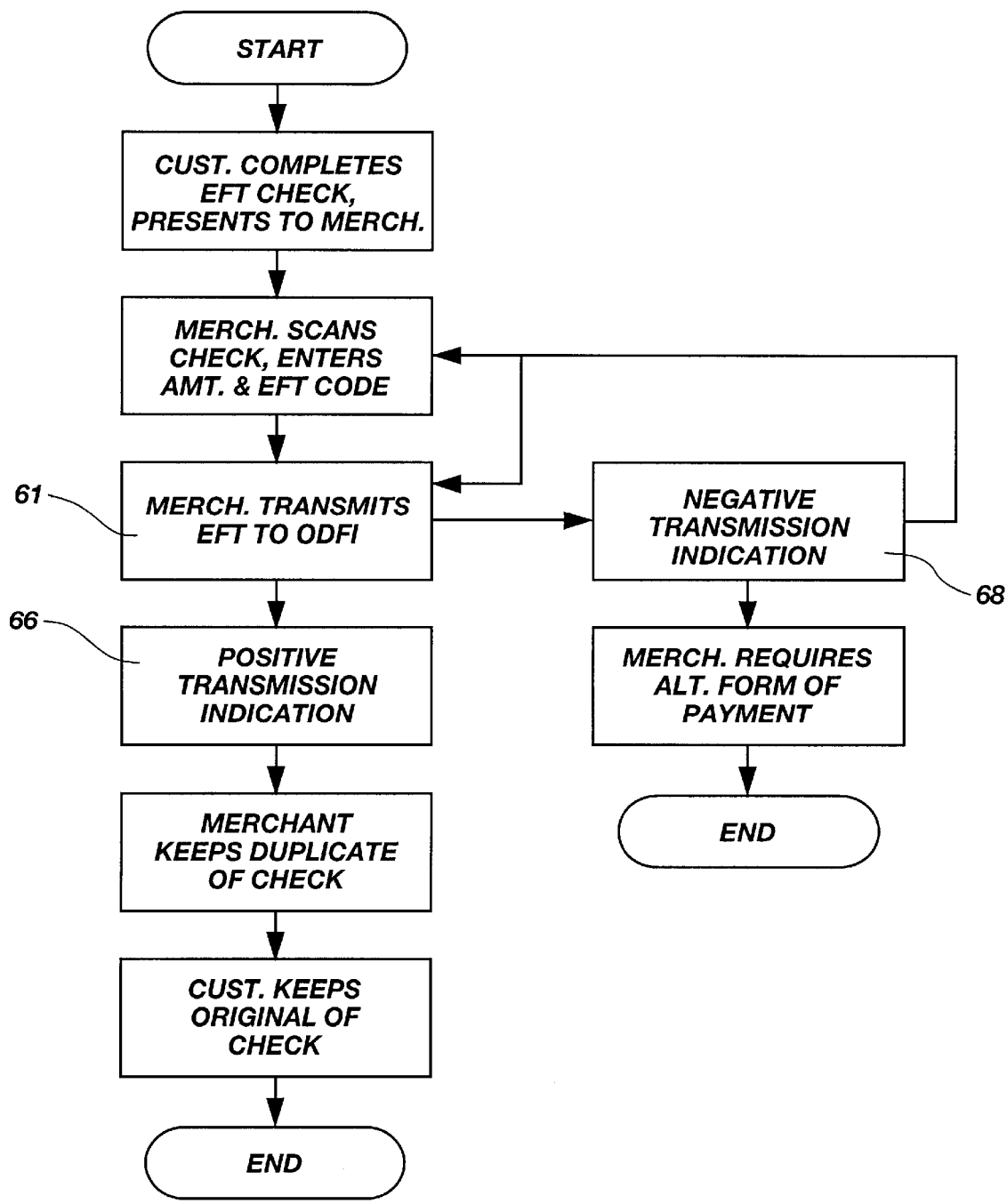
FIG. 3 is a flow chart of the method of electronic funds transfer based upon presentment of an EFT authorizing check according to the present invention, as viewed from the point of sale.

FIG. 3 is a flow chart of the method of electronic funds transfer based upon presentment of an EFT authorizing check according to the present invention, as viewed from the point of sale. To start a transaction using the check as an EFT authorizing document, the customer first fills out and signs the two-part check form 10, and checks the "yes" box to indicate that an electronic funds transfer is desired. This notation will show up on the original, top part 12 of the check 10, and also on the duplicate 14. The customer then presents the duplicate part of this check to the merchant at the point of sale.

A typical point of sale device 50 (FIG. 7) that may be used in accordance with this invention will be a computer controlled cash register, having a keyboard 52 for data entry, a cash drawer 54, a CRT display 56 for displaying transaction related information, and a MICR reader 58. The POS terminal may also include a biometric input device, such as a fingerprint scanner 59, which may be used for biometric identity verification, as will be described in more detail below. The POS terminal will also include, either internally or externally connected, a modem 60 suitable for financial transaction transmission such as, for example, a Trans-380 modem as is typically used for credit card transaction approval and check verification. It will be apparent that other elements such as credit card readers, etc. may also be included in the POS terminal, and that all of these elements need not be present in a single point of sale device 50. Other point of sale equipment combinations and configurations may work equally well for the purposes of the present invention.

With the EFT box 134 checked "yes," the duplicate 14 operates as an authorizing document authorizing the merchant to perform an Electronic Check Presentment ("ECP") in the amount indicated on the face of the check, by submission as an EFT within the ACH network of the Federal Reserve System. This is done in the following manner. Upon receiving the check, the merchant scans the check using the MICR equipment 58 in order to read the bank transfer number and customer account number 120 from the face of the duplicate part 14 of the check 10, and inputs via the keyboard 52 of the POS device 50 the transaction amount, and some appropriate code as required to indicate that an electronic funds transfer is to be initiated. At this point, at the step designated 61, the transaction information, including a code representing the EFT authorization, is electronically transmitted via the modem 60 through communication lines 62 to the computer system of the Originating Depository Financial Institution ("ODFI") 64, which is the institution where the proceeds of the transaction will be deposited. The ODFI is typically the merchant's bank, but may be some other institution, as will be described in more detail below.

The computer system at the ODFI 64 receives the EFT authorization and related information, and preferably sends a positive transmission indication 66 back to the POS terminal 50 in real time, to inform the merchant that the information has been successfully received, and that the EFT will be processed. This indication will preferably appear on the CRT display 56 of the POS terminal 50, or similar discernable output device. If there is a transmission, data, or other problem with the EFT transmission for any reason, a negative transmission indication 68 will preferably be transmitted back to the POS terminal 50. At this point, depending on the nature of the problem, the merchant may either go back one step and simply resend the EFT transmission to the ODFI 64, or may go back two steps to rescan the check, re-enter the transaction information, and resend the EFT transmission to the ODFI, or simply require some other form of payment. It will be apparent that the merchant may try any or all of these remedial steps if a negative transmission indication is received.

Following the receipt of a positive transmission indication 66, the transaction is essentially complete from the standpoint of the merchant and the consumer at the point of sale. The merchant keeps the duplicate part 14 of the check 10, and places it in the merchant's files 70 as a record of the EFT authorization. Keeping this record will provide the merchant with valuable evidence of the EFT authorization in the event that the EFT is returned for insufficient funds in the payor's account, or other reasons in a manner similar to that of dishonored checks. Also, the merchant is required by law to keep this record for at least seven years after the transfer. The customer keeps the original part 12 of the check, as their record of the EFT authorization. Advantageously, however, as with all electronic funds transfers, no paper is required to physically circulate through the banking system, saving time, money, and wasted effort.

Figure 4:
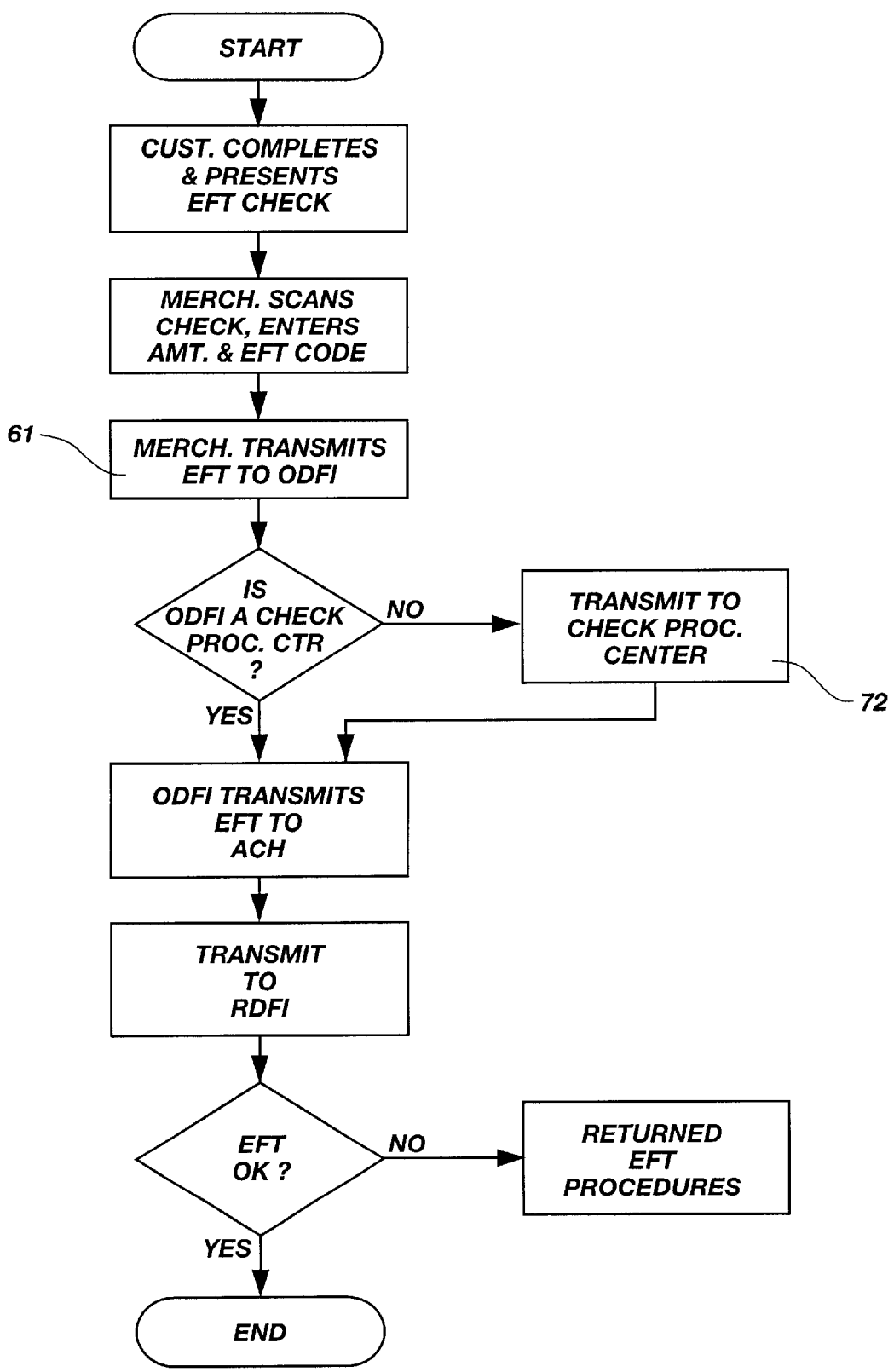
FIG. 4 is a flow chart of a system for effectuating an electronic funds transfer based upon presentment of an EFT authorizing check at the point of sale according to the principles of the present invention.

While the diagram of FIG. 3 shows the transaction from the point of view of the customer at the point of sale, the transaction is not entirely complete as far as the banking system is concerned. FIG. 4 presents a flow chart of the system for effectuating an EFT according to the principles of the present invention from the viewpoint of the electronic banking system. The first three steps of this flow chart are the same as the first three steps of FIG. 3. The customer completes and presents the check duplicate, the merchant scans it and inputs additional transaction information, and transmits the information to the ODFI. Following receipt of a positive transmission indication (not shown in FIG. 4) as discussed above, the merchant is not directly aware of the remaining steps in the process, which are shown in FIG. 4. The EFT transmission is first sent to the ODFI as explained above, which is generally the merchant's banking institution. However, not all financial institutions also include check processing centers. For example a relatively small bank may service commercial customers, but may not have the resources to justify operating their own check processing center. Such a bank will typically contract out check processing services to another, larger institution that operates a check processing center. Thus, when the EFT transmission is received by the ODFI, the computer system will route this transmission to a third party check processing center if the ODFI does not possess one of its own.

From this point, the ODFI 64 or check processing center 72 transmits the EFT transmission via communications lines 62 to a centralized Automated Clearing House (ACH) 74, which manages and controls the flow of electronic funds transfers between member banks of the Federal Reserve System. The ACH 74 in turn is connected via communications lines 62 to the computer system at the Receiving Depository Institution ("RDFI") 76, which is the customer's bank or other financial institution. Upon receipt of the EFT transmission, the computer system at the RDFI compares the transaction with its database of account information to determine, among other things, whether the numbered account is valid, and whether it contains sufficient funds. If the RDFI account is valid and has sufficient funds, the RDFI 76 automatically debits the account for the value of the EFT authorization, and electronically transfers those funds through the ACH 74 to the merchant's account at the ODFI 64, and the transaction is complete.

This entire process, from the transaction at the POS to the actual electronic transfer of funds from the RDFI to the ODFI, typically takes about 48 hours. This is due to many factors. First, banks typically handle check processing and settlement at night, after the end of daily banking hours, when the demands on bank computer systems are not as great. Additionally, the sheer volume of transactions that occur every day place a great data processing burden on bank computer systems. Furthermore, because the EFT transaction must be routed through several computer systems before reaching the RDFI, it is forced to "wait" in computer memory between individual steps in the transmission process. For this reason, the actual transfer of funds does not occur in real time while the customer waits at the POS, but involves a couple of days' delay. However, this level of delay is a great improvement over the conventional checking system, which because of the time required for physical routing of the paper checks can require up to 10–15 days for checks to clear. Not only is the cost of transport of all that paper expensive, but the delay in receipt of funds by payees results in the loss of significant interest income in the interim.

Because of the brief delay in actual transfer of funds, it is still possible for an EFT to be dishonored, like a conventional check. If the computer at the RDFI 76 determines that there is some reason to dishonor the EFT, it will automatically institute procedures for a returned EFT, as shown in FIG. 4. These procedures (not shown) are similar to those followed when a conventional check is dishonored. If the transmission presents an account number that was once valid at the RDFI 76, the RDFI typically mails a letter to the account holder at their last known address, and transmits a dishonored transaction message through the ACH to the ODFI 64 directly or to the ODFI through a check processing center. The ODFI then notifies the merchant by mail of the dishonored EFT, and the merchant can then take steps to collect the amount of the check or take other action. Advantageously, EFT authorizing the instrument 14 of the present invention includes language 138 authorizing the RDFI to modify the instrument to pay a non-sufficient funds (NSF) fee of up to $25 as permitted by law. This notation avoids the significant problem of modifying EFT authorizing documents, which is not permitted without a signed writing by the maker.

Advantageously, the system and method of the present invention provides the merchant with essential proof in the form of the actual EFT authorizing document—the duplicate part 14 of the check—which the merchant placed in its files 70 following the transaction at the POS. Without this document, the merchant may be unable to prove that the customer ever authorized an EFT.

Figure 5:
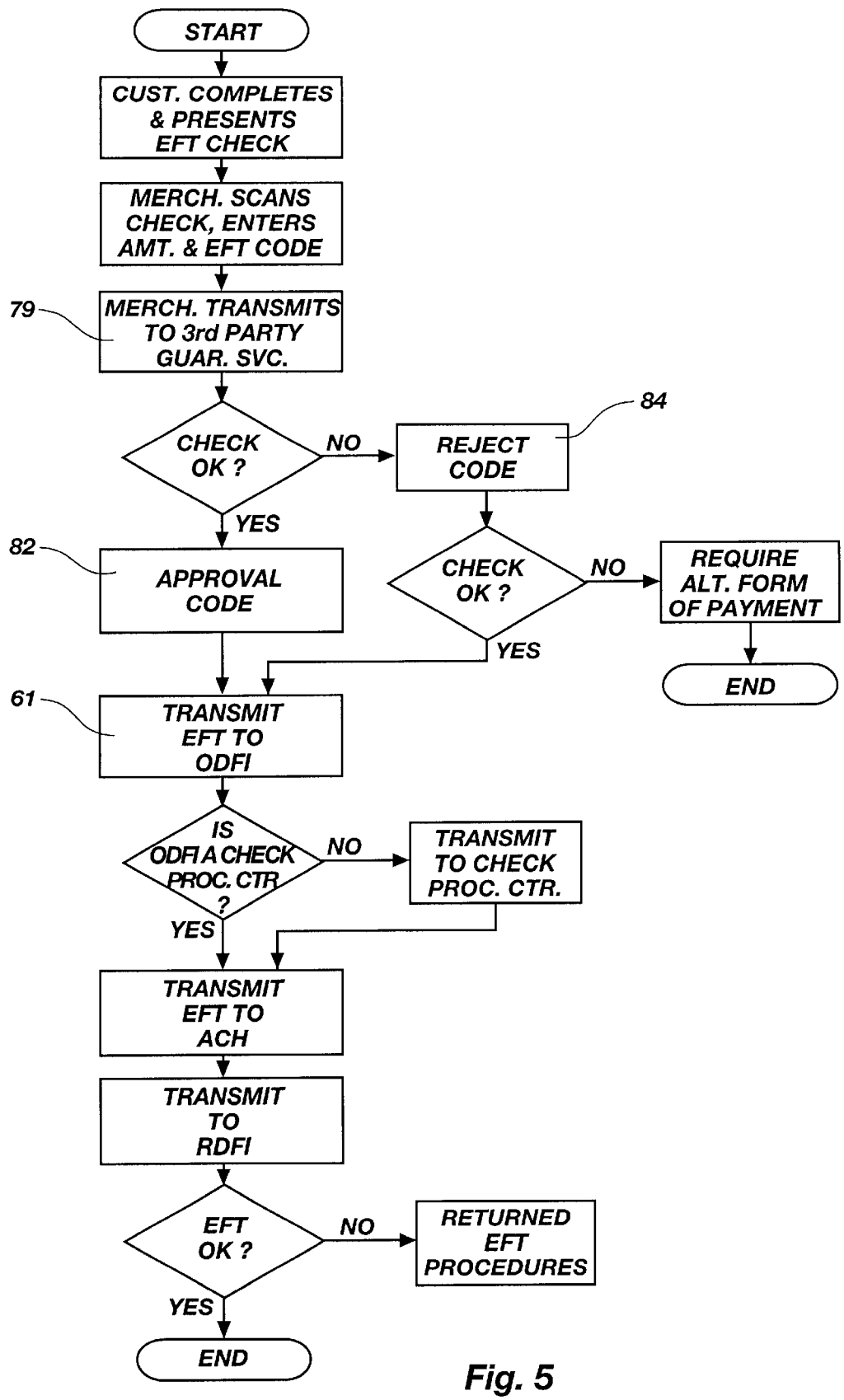
FIG. 5 is a flow chart of the system of FIG. 4 incorporating the use of a check verification or guarantee service prior to initiating the electronic funds transfer.

The possibility of a dishonored EFT provides the impetus for the embodiment of the invention shown in FIG. 5. FIG. 5 is a flow chart of the method of FIG. 4 incorporating the use of a check verification or guarantee service prior to initiating the electronic funds transfer. The first two steps of this method are the same as the first two steps of FIG. 3: the customer completes and presents the check duplicate, and the merchant scans it and inputs additional transaction information. At this point, as indicated at step 79, before initiating an EFT, the merchant first transmits via communication lines 62 the check transaction information to a third party check guarantee/verification service 80. Such services are well known, and typically involve the comparison of the checking account identity (as determined from the account number and the RDFI identity as indicated by the transfer number) against a negative file. This file is created by obtaining and maintaining information from participating commercial and financial institutions regarding instances of bad checks and so forth. If the third party check verification service determines that there is no negative history on file regarding the account in question, it will send an approval code 82 to the merchant at the POS, and the merchant can accept the check with increased confidence that it is unlikely to be dishonored. Alternatively, for a higher fee, the third party service provider can provide a guarantee of the check. In such a system, the third party service provider agrees to pay the face value of any check that is dishonored, if the merchant first received an approval code for that check before accepting it. So long as the merchant records this code in a proper manner (usually by writing directly on the check), the check guarantee company will buy that check at face value from the merchant if it is subsequently dishonored.

A check verification or security process may also take other forms besides the use of a third party check guarantee service. For example, some larger businesses maintain their own computer database for keeping a negative file of individuals who have presented bad checks at that business in the past. In any event, however, once the merchant has received an approval code 82, it may presumably accept the check and proceed with the EFT as shown in FIG. 4. However, if a rejection code 84 is received from the check verification or guarantee service, the merchant still has the option to accept the check, or refuse it and require some other form of payment. For example, a merchant that is personally acquainted with the customer may decide to accept the check even though a rejection code 84 was received. Thereupon, the merchant proceeds to initiate the EFT as above. It will be apparent that the computerized POS terminal may be programmed to automatically execute the EFT upon receiving a check approval code 82, and may be similarly programmed to prevent an EFT if a rejection code 84 is received, at the option of the merchant.

Figure 6:
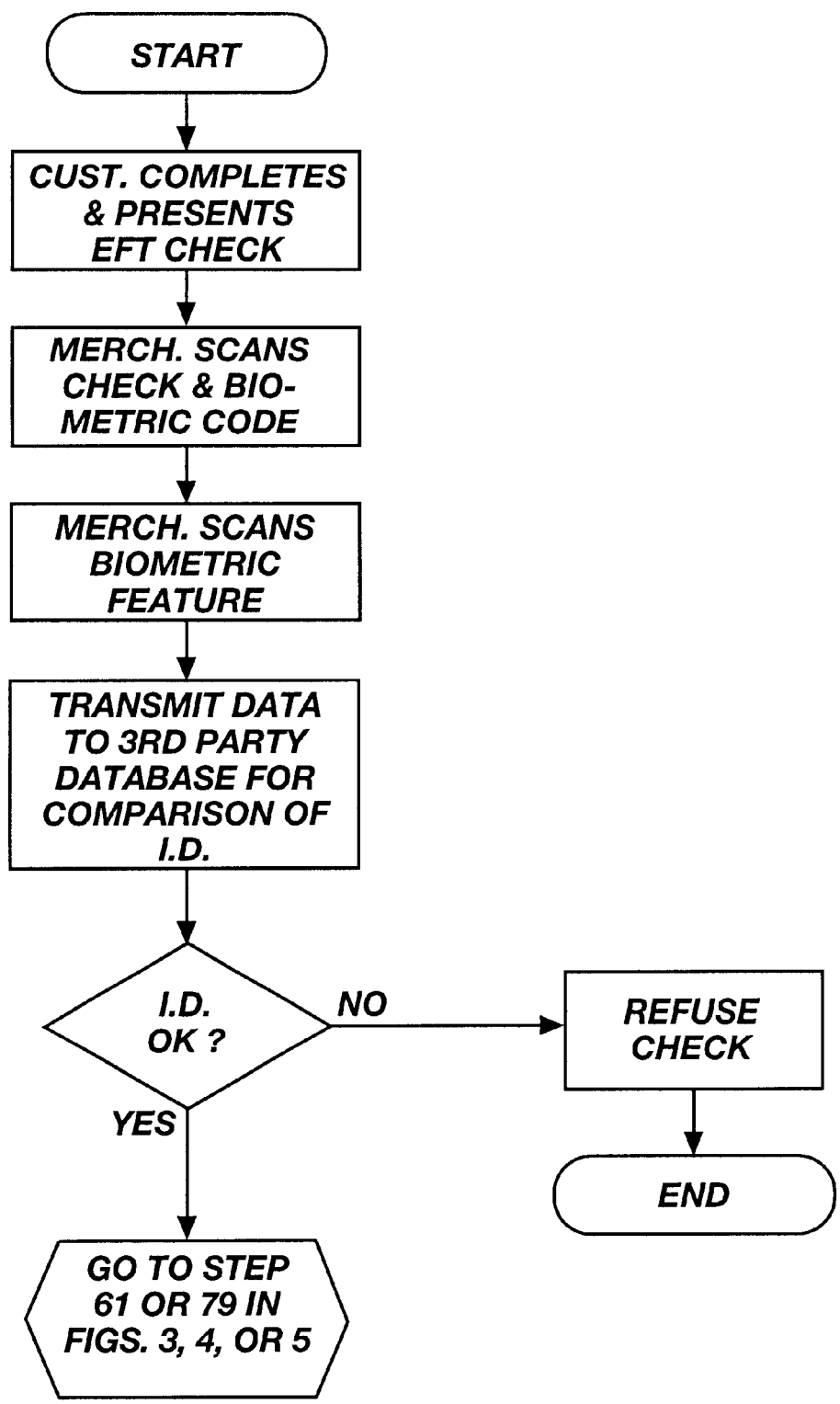
FIG. 6 is a flow chart of the system of the present invention incorporating the use of a biometric identification verification system prior to initiating the electronic funds transfer.

FIG. 6 presents a flow chart of yet another embodiment of the present invention incorporating the use of a biometric identification verification system prior to initiating the electronic funds transfer. In this embodiment, after the customer presents the completed EFT authorizing check duplicate 14, the merchant scans the check in the usual manner, except that the POS terminal 50 will also scan the machine readable biometric code 130. Then the merchant will require the customer to submit to a biometric scan through a biometric input device, such as placing a finger 86 on the fingerprint scanner 59 depicted in FIG. 7. Various forms of biometric scanning may be used, such as facial feature recognition, voiceprint, retinal scan, and other methods currently known or under development. The biometric code 130 contains information regarding the customer's biometric feature which was earlier recorded by the customer's financial institution, such as at the time the account was opened, and encoded on the printed checks. In one embodiment, the POS device 50 and biometric scanner 59 compare the biometric feature of the customer with the biometric information which was scanned from the check, and give an indication regarding whether the biometric feature of the one presenting the check matches the biometric information recorded in the code 130. If the two do not match, the merchant will presumably refuse the check, and terminate the transaction.

However, there are limitations on the amount of information which may be recorded in a biometric code directly on the face of a check. For example, a one-dimensional bar code 30 and 130 as depicted on the checks of FIGS. 1 and 2 may contain up to 50 bytes of information. However, an adequately detailed human fingerprint scan requires approximately 480 bytes of computer memory. Thus at the present time it is somewhat impractical to record sufficient biometric information on the face of a check to allow adequate identity verification. This consideration gives rise to another alternative embodiment, wherein the check does not include a separate biometric code 130, but the bank transfer number and customer account number 120 are used instead as a unique identifier corresponding to biometric information contained in a database external to the POS device. In this embodiment, once the merchant has scanned the check and the customer's biometric feature, the POS device electronically transmits the account identity and customer biometric data to a third party database for comparison. Such a database could be maintained by a check verification/guarantee service 80, such as described above, or may be maintained by some other third party. If identity verification is performed by a check verification/guarantee service provider, the identity verification could advantageously proceed in concert with the check verification or guarantee service.

Whichever scheme is chosen, once the account identity and customer biometric data have been received by the computer containing the biometric database, the computer will compare the biometric feature of the customer with the biometric information corresponding to that account. If the two do not match, a rejection code is sent to the merchant, who will then presumably refuse the check, and terminate the transaction. If the identity of the customer matches the recorded biometric information, the merchant may then proceed with the transaction beginning at steps 61 or 79 of FIGS. 3, 4, or 5.

The system and method herein described provides a simple and efficient method of allowing customers to authorize electronic funds transfers without having to fill out special documents. It also bridges the gap between the "Customer as Keeper" and "Merchant as Keeper" models by allowing the customer to retain a tangible record of the transaction in the form of a check, while simultaneously allowing the merchant to keep a record of the EFT authorization as required by law, and which will be useful for collections or legal action if necessary. This system and method also allows merchants to take advantage of existing MICR and point of sale equipment to effectuate quick financial transfers, which reduces transaction costs and increases interest income for the business by avoiding long collection turnaround.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A method for a payee to initiate at a point of sale an electronic funds transfer from a funds account of a payor to a funds account of a payee, comprising the steps of:

(a) obtaining from the payor a completed two-part draft instrument, comprising an original and a duplicate, the original being configured for use as a conventional check, and the duplicate being configured for selective use as either a duplicate of the original, or as an originating document for an electronic funds transfer for the face amount of the draft instrument, the payor completing the draft instrument by making a single mark on the original which completes a single selectable indication common to both the original and the duplicate designating whether the draft instrument is to be used to authorize an electronic funds transfer;

(b) presenting the draft instrument electronically through an electronic clearing house network so as to initiate an electronic funds transfer from the funds of the payor to the funds of the payee in the amount of the draft instrument;

(c) keeping the duplicate of the draft instrument as a payee's record of the electronic funds transfer authorization; and (d) allowing the payor to keep the original of the draft instrument as a record of the electronic funds transfer authorization.

2. The method of claim 1, wherein the step of presenting the draft instrument electronically through an electronic clearing house network comprises the additional steps of:

(e) reading a machine-readable account identifying designation from the face of the draft instrument by means of magnetic ink character recognition equipment at the point of sale, so as to create an electronic request record, said account identifying designation identifying the institution which holds the payor's funds account and the account number thereof;

(f) modifying said electronic request record to include the amount of the draft instrument;

(g) electronically transmitting said electronic request record to an originating depository financial institution for routing through an electronic clearing house network so as to initiate an electronic funds transfer from the funds of the payor to the funds of the payee in the amount of the draft instrument.

3. The method of claim 2, further comprising the step of presenting the draft instrument electronically through the Automated Clearing House network of the Federal Reserve System.

4. The method of claim 1, further comprising the steps of:

(h) scanning a biometric identification code provided on the face of the draft instrument in machine readable form, said code containing an electronic record of a biometric feature of the authorized maker of draft instruments from said account;

(i) scanning a biometric feature of the payor at the point of sale to create an electronic record of the payor's biometric feature;

(j) comparing the electronic record of the authorized maker's biometric feature with the electronic record of the payor's biometric feature so as to allow the payee to determine whether the payor is an authorized maker of draft instruments from said account.

5. The method of claim 2, further comprising the steps of:

(k) scanning a biometric feature of the payor at the point of sale to create an electronic record of the payor's biometric feature;

(l) electronically transmitting said account identifying designation and said electronic record of the payor's biometric feature to a processor and database containing a record of the corresponding biometric feature of an authorized maker of drafts on said account for determining whether the payor's biometric feature matches that of an authorized maker; and (m) receiving from said processor and database an electronic transmission for creating a discernable signal at the point of sale indicating whether the payor's biometric feature matches that of an authorized maker before the payee electronically transmits said electronic request record to an originating depository financial institution so as to initiate an electronic funds transfer.

6. The method of claim 2, further comprising the steps of:

(n) electronically transmitting said account identifying designation to a check guarantee/verification service provider; and (o) receiving from said check guarantee/verification service provider an electronic transmission for creating a discernable indication advising the payee whether to accept the draft instrument before the payee electronically transmits said electronic request record to an originating depository financial institution so as to initiate an electronic funds transfer.

7. The method of claim 1, wherein the step of presenting the draft instrument electronically through an electronic clearing house network comprises the additional steps of:

(p) reading a machine-readable account identifying designation from the face of the draft instrument by means of magnetic ink character recognition equipment at the point of sale, so as to create an electronic request record, said account identifying designation identifying the institution which holds the payor's funds account and the account number thereof;

(q) scanning a biometric feature of the payor at the point of sale to create an electronic record of the payor's biometric feature;

(r) electronically transmitting said account identifying designation and said electronic record of the payor's biometric feature to a processor and database containing a record of the corresponding biometric feature of an authorized maker of drafts on said account, for determining whether the payor's biometric feature matches that of an authorized maker;

(s) receiving from said processor and database an electronic transmission for creating a discernable signal at the point of sale indicating whether the payor's biometric feature matches that of an authorized maker;

(t) electronically transmitting said account identifying designation to a check guarantee/verification service provider;

(u) receiving from said check guarantee/verification service provider an electronic transmission for creating a discernable indication advising the payee whether to accept the draft instrument;

(v) modifying said electronic request record to include the amount of the draft instrument; and (w) electronically transmitting said electronic request record to an originating depository financial institution for routing through the Automated Clearing House network of the Federal Reserve System so as to initiate an electronic funds transfer from the funds of the payor to the funds of the payee in the amount of the draft instrument.

8. A system for authorizing an electronic funds transfer from a payor to a payee at a point of sale, comprising:

a two-part draft instrument comprising an original and a duplicate, the original being configured for use as a conventional check, and the duplicate being configured for use as a duplicate of the draft instrument and as the originating document for an electronic funds transfer, the original and duplicate further including a single selectable indication common to both the original and the duplicate, configured for designating by a single common mark whether the draft instrument is to be used to authorize an electronic funds transfer;

an account identifying designation printed on the original and on the duplicate of the two-part draft instrument in machine readable form, said account identifying designation identifying the financial institution holding the payor's account and identifying the payor's funds account at the payor financial institution;

means for electronically reading the account identifying designation from the draft instrument upon presentment by the payor; and means for electronically presenting the draft instrument through an automated clearing house network, so as to initiate an electronic funds transfer at the point of sale;

means for keeping and storing the duplicate of the draft instrument as a payee's record of the electronic funds transfer authorization.

9. The system as described in claim 8, further comprising:

means for electronically transmitting said account identifying designation to a check guarantee/verification service provider;

means for receiving from said check guarantee/verification service provider an electronic transmission for creating a discernable indication advising the payee whether to accept the instrument before the payee electronically presents the draft instrument.

10. The system as described in claim 8, further comprising:

a biometric identification code printed on the original and on the duplicate of the two-part draft instrument in machine readable form, said code containing an electronic record of a biometric feature of the authorized maker of draft instruments from said account;

means for scanning a biometric feature of the payor at the point of sale to create an electronic record of the payor's biometric feature;

means for comparing the electronic record of a biometric feature of the authorized maker with the electronic record of the payor's biometric feature to determine whether the payee's biometric feature matches that of an authorized maker before the payee electronically presents the draft instrument.

11. The system as described in claim 8, further comprising:

means for scanning a biometric feature of the payor at the point of sale to create an electronic record of the payor's biometric feature;

means for electronically transmitting said account identifying designation and said electronic record of the payor's biometric feature to a processor and database containing a record of the corresponding biometric feature of an authorized maker of drafts on said account, for determining whether the payor's biometric feature matches that of an authorized maker;

means for receiving from said processor and database an electronic transmission for creating a discernable signal at the point of sale indicating whether the payor's biometric feature matches that of an authorized maker before the payee electronically presents the draft instrument.

12. The system as described in claim 8, further comprising:

means for creating an electronic request record including the account identifying designation and the amount of the draft instrument; and means for electronically presenting the draft instrument by sending the request record through the Automated Clearing House network of the Federal Reserve System to initiate an electronic transfer of funds from the payor's account to the payee's account at the payee's financial institution.

13. The system as described in claim 8, further comprising:

means for electronically transmitting said account identifying designation to a check guarantee/verification service provider;

means for receiving from said check guarantee/verification service provider an electronic transmission for creating a discernable indication advising the payee whether to accept the draft instrument before the payee electronically presents the draft instrument;

means for creating an electronic request record including the account identifying designation and the amount of the draft instrument; and means for electronically presenting the draft instrument by sending the request record through the Automated Clearing House network of the Federal Reserve System to initiate an electronic transfer of funds from the payor's account to the payee's account at the payee's financial institution.

14. The system as described in claim 8, further comprising:

means for scanning a biometric feature of the payor at the point of sale to create an electronic record of the payor's biometric feature;

means for electronically transmitting said account identifying designation and said electronic record of the payor's biometric feature to a processor and database containing a record of the corresponding biometric feature of an authorized maker of drafts on said account, for determining whether the payor's biometric feature matches that of an authorized maker;

means for receiving from said processor and database an electronic transmission for creating a discernable signal at the point of sale indicating whether the payor's biometric feature matches that of an authorized maker before the payee electronically presents the draft instrument;

means for creating an electronic request record including the account identifying designation and the amount of the draft instrument; and means for electronically presenting the draft instrument by sending the request record through the Automated Clearing House network of the Federal Reserve System to initiate an electronic transfer of funds from the payor's account to the payee's account at the payee's financial institution.

15. The system as described in claim 8, further comprising:

means for electronically transmitting said account identifying designation to a check guarantee/verification service provider;

means for receiving from said check guarantee/verification service provider an electronic transmission for creating a discernable indication advising the payee whether to accept the draft instrument before the payee electronically presents the draft instrument;

means for scanning a biometric feature of the payor at the point of sale to create an electronic record of the payor's biometric feature;

means for electronically transmitting said account identifying designation and said electronic record of the payor's biometric feature to a processor and database containing a record of the corresponding biometric feature of an authorized maker of drafts on said account, for determining whether the payor's biometric feature matches that of an authorized maker;

means for receiving from said processor and database an electronic transmission for creating a discernable signal at the point of sale indicating whether the payor's biometric feature matches that of an authorized maker before the payee electronically presents the draft instrument;

means for creating an electronic request record including the account identifying designation and the amount of the draft instrument; and means for electronically presenting the draft instrument by sending the request record through the Automated Clearing House network of the Federal Reserve System to initiate an electronic transfer of funds from the payor's account to the payee's account at the payee's financial institution.

16. A two-part draft instrument form for use to negotiate funds from a funds account of a payor to a funds account of a payee, comprising:
- a first part configured for use as a conventional paper check; and
- a second part configured for being a duplicate of the first part and also configured for separate use as the originating document authorizing an electronic funds transfer;
- the first part and second part further including a single selectable indication common to both the first part and the second part, configured for designating by a single common mark whether the first part is to be used as a check, or the second part is to be used to authorize an electronic funds transfer.

17. The two-part draft instrument as described in claim 16, further comprising an account identifying designation printed on the first part and on the second part in machine readable form, said account identifying designation identifying the financial institution holding the payor's account and identifying the payor's funds account at the payor financial institution.

18. The invention as described in claim 17 wherein said account identifying designation is printed in magnetic ink that is computer recognizable to allow it to be machine read.

19. The two-part draft instrument as described in claim 16 further comprising a biometric identification code printed on the first part and on the second part in machine readable form, whereby the payee may obtain information that will allow verification of the identity of the payor at the point of sale before the payee accepts the draft instrument.

* * * * *